United States Patent
Bulmer

(10) Patent No.: US 6,396,415 B1
(45) Date of Patent: May 28, 2002

(54) METHOD AND SYSTEM OF COMMUNICATING IN A SUBTERRANEAN WELL

(75) Inventor: James H. Bulmer, Sherwood Park (CA)

(73) Assignee: Wood Group ESP, Inc., Oklahoma City, OK (US)

( * ) Notice: Subject to any disclaimer, the term of this patent is extended or adjusted under 35 U.S.C. 154(b) by 0 days.

(21) Appl. No.: 09/333,118

(22) Filed: Jun. 14, 1999

(51) Int. Cl.⁷ .................................................. G01V 3/00
(52) U.S. Cl. ................. 340/855.8; 340/855.4; 340/855.5; 340/855.9
(58) Field of Search .................. 340/855.5, 854.9, 340/855.4, 855.9, 855.8

(56) References Cited

U.S. PATENT DOCUMENTS

| | | | |
|---|---|---|---|
| 2,749,512 A | 6/1956 | Blair | 324/64 |
| 3,284,669 A | 11/1966 | Boyd | 317/13 |
| 3,340,500 A | 9/1967 | Boyd et al. | 340/18 |
| 3,406,359 A | 10/1968 | Welz et al. | 324/1 |
| 3,445,658 A | 5/1969 | Ward | 250/71.5 |
| 3,465,239 A | 9/1969 | Wilson et al. | 324/1 |
| 3,495,212 A | 2/1970 | Brock | 340/18 |
| 3,514,750 A | 5/1970 | Pritchett et al. | 340/18 |
| 3,718,194 A | 2/1973 | Hering et al. | 174/45 |
| 3,875,506 A | 4/1975 | Cath et al. | 324/110 |
| 3,991,611 A | 11/1976 | Marshall, III et al. | 73/151 |
| 4,093,936 A | 6/1978 | Eberline et al. | 340/18 CM |
| 4,117,397 A | 9/1978 | Fukao et al. | 324/54 |
| 4,136,327 A | 1/1979 | Flanders et al. | 340/18 FM |
| 4,157,535 A | 6/1979 | Balkanli | 340/18 CM |
| 4,178,579 A | 12/1979 | McGibbeny et al. | 340/856 |
| 4,194,128 A | 3/1980 | Biglin | 307/3 |
| 4,301,399 A | 11/1981 | Miller et al. | 324/54 |
| 4,340,853 A | 7/1982 | Braun et al. | 324/51 |
| 4,415,895 A | 11/1983 | Flagg | 340/856 |
| 4,523,194 A | 6/1985 | Hyde | 340/856 |
| 4,581,613 A * | 4/1986 | Ward et al. | 340/856 |
| 4,631,535 A | 12/1986 | Butlin | 340/856 |
| 4,689,620 A | 8/1987 | Wondrak | 340/856 |

(List continued on next page.)

FOREIGN PATENT DOCUMENTS

| | | |
|---|---|---|
| DE | 197 25 173 | 12/1998 |
| EP | 0 398 581 | 11/1990 |
| GB | 1116905 | 6/1968 |
| GB | 1589546 | 5/1981 |
| GB | WO 93/05272 | 3/1993 |
| GB | 2 283 889 | 5/1995 |
| WO | WO 98/14042 | 4/1998 |

Primary Examiner—Timothy Edwards
(74) Attorney, Agent, or Firm—McAfee & Taft

(57) ABSTRACT

Communicating relative to a subterranean well includes encoding information in an amplitude and a duration for a pulse. A detectable change in response to both the amplitude and duration communicates the information. Two distinct items of information can be encoded wherein the information encoded in the amplitude is distinct from the information encoded in the duration. A single, more highly resolved, item of information can be defined in that the amplitude and the duration can together represent one aspect of the information to be communicated. Particular application is found in a subterranean well having three-phase power conductors connected to a three-phase motor in the well with the amplitude and duration being communicated through the power conductors. A system for communicating in a subterranean well includes an information source to provide a signal representing a numerical value to be communicated in a subterranean well; it also includes an encoder, connected to the information source, to encode the numerical value into an amplitude and a duration for an analog pulse wherein the amplitude and duration together define the numerical value.

4 Claims, 13 Drawing Sheets

Microfiche Appendix Included
(1 Microfiche, 36 Pages)

U.S. PATENT DOCUMENTS

| | | | |
|---|---|---|---|
| 4,901,070 A | 2/1990 | Vandevier | 340/856 |
| 4,995,058 A * | 2/1991 | Byers et al. | 340/861 |
| 5,365,229 A | 11/1994 | Gardner et al. | 340/855.4 |
| 5,387,907 A | 2/1995 | Gardner et al. | 340/854.9 |
| 5,515,038 A | 5/1996 | Smith | 340/853.3 |
| 5,539,375 A | 7/1996 | Atherton | 340/310.01 |
| 5,587,797 A | 12/1996 | Dirr | 358/261.1 |
| 6,072,829 A | 6/2000 | Dirr | 375/239 |

* cited by examiner

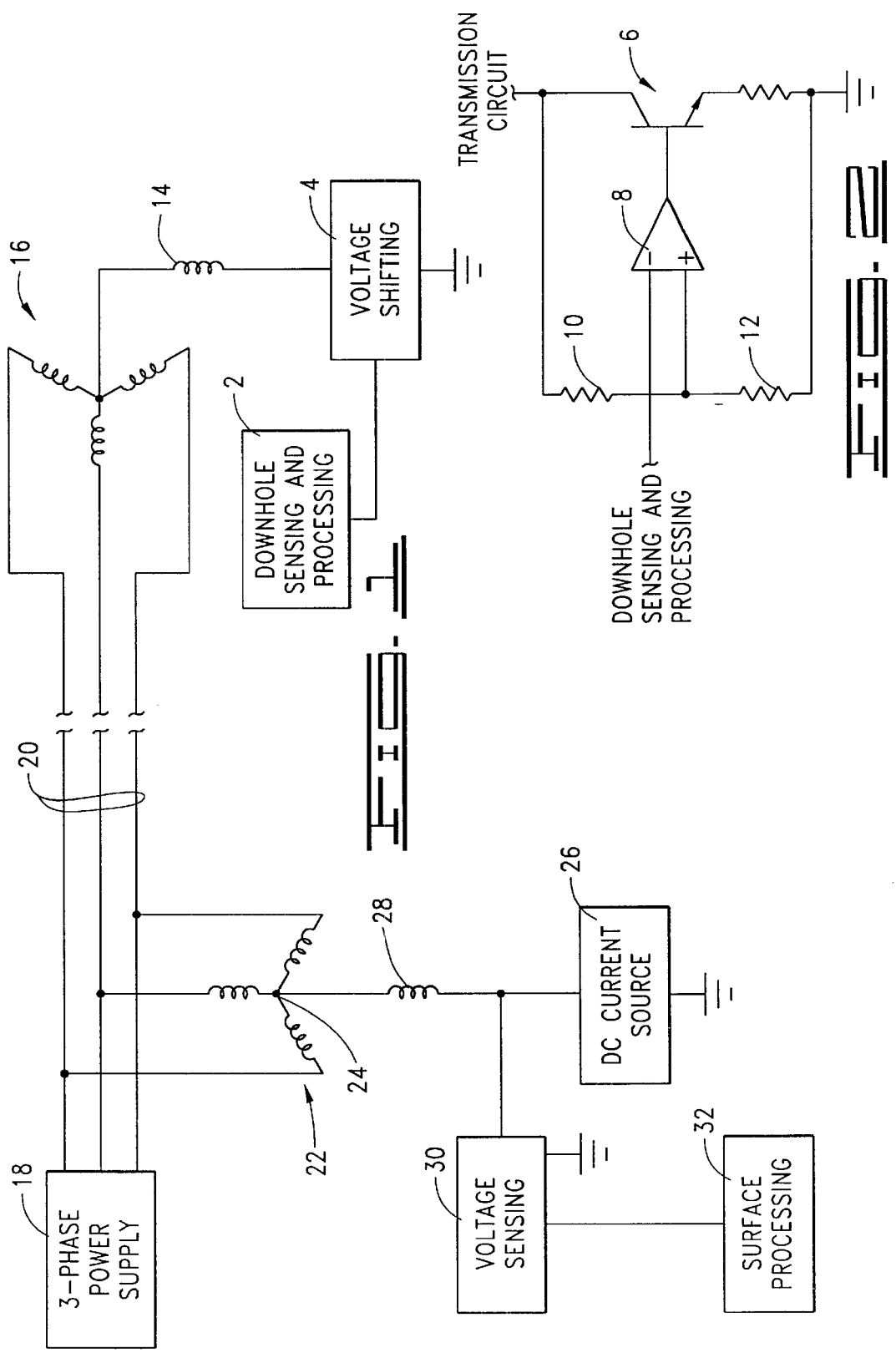

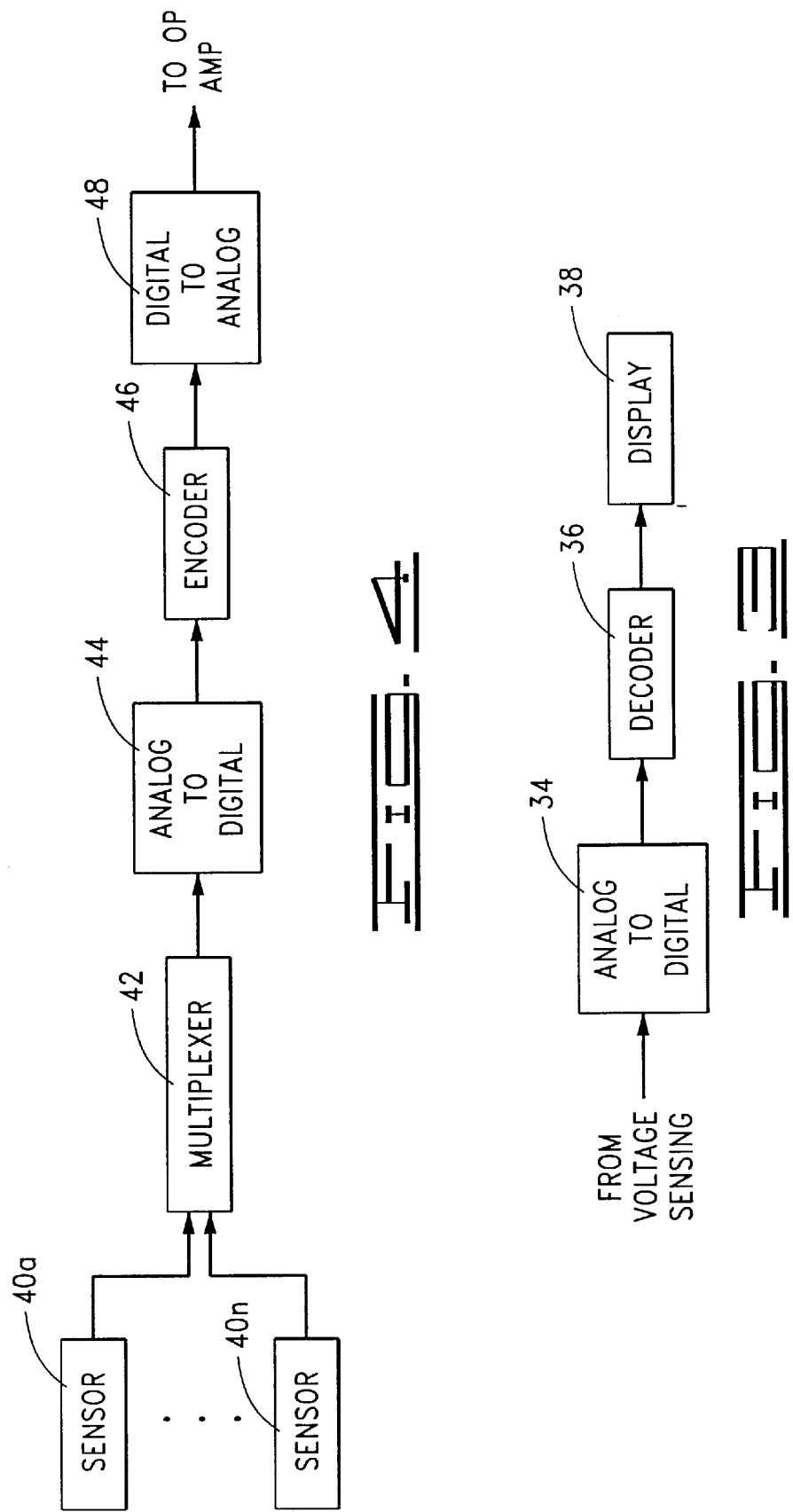

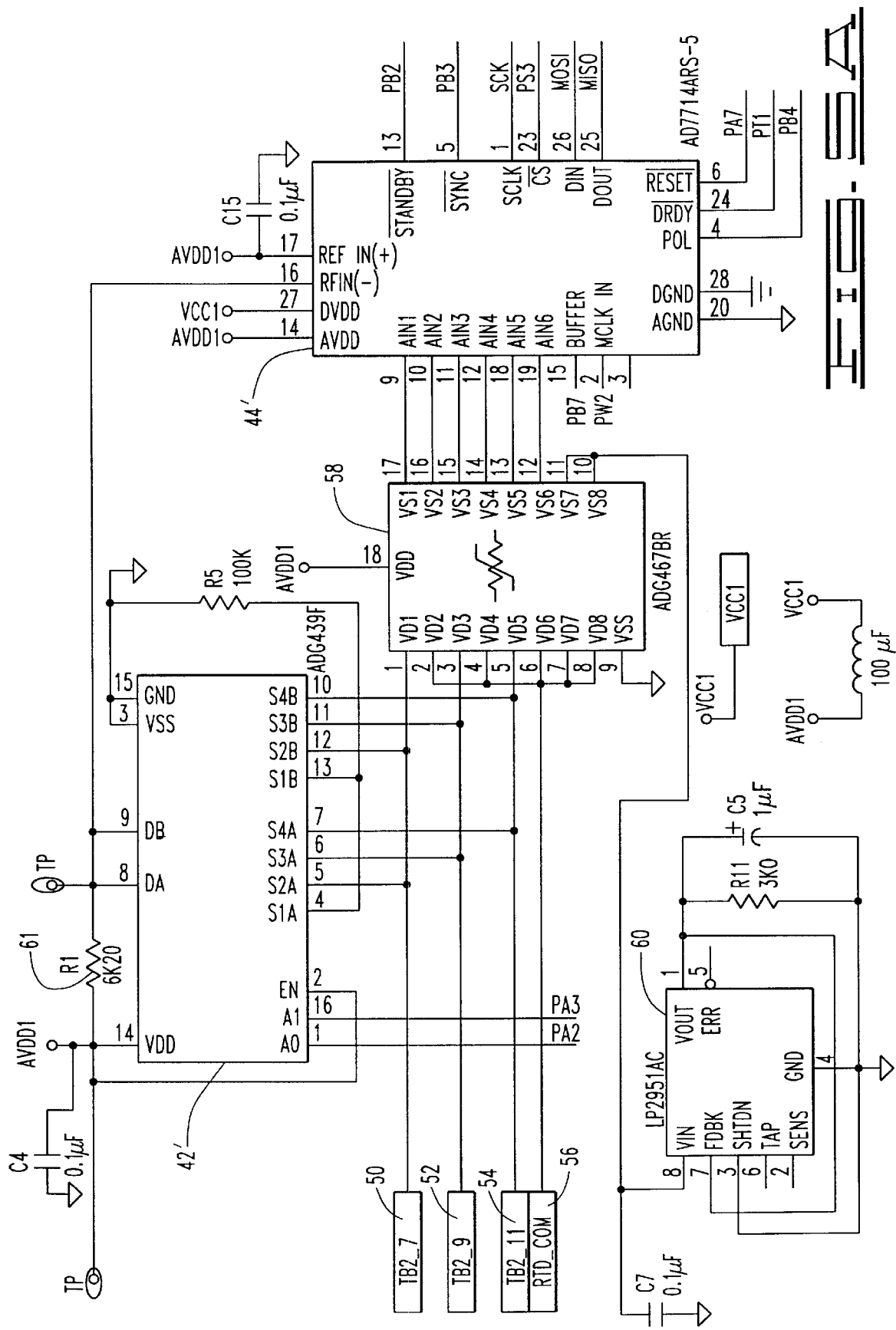

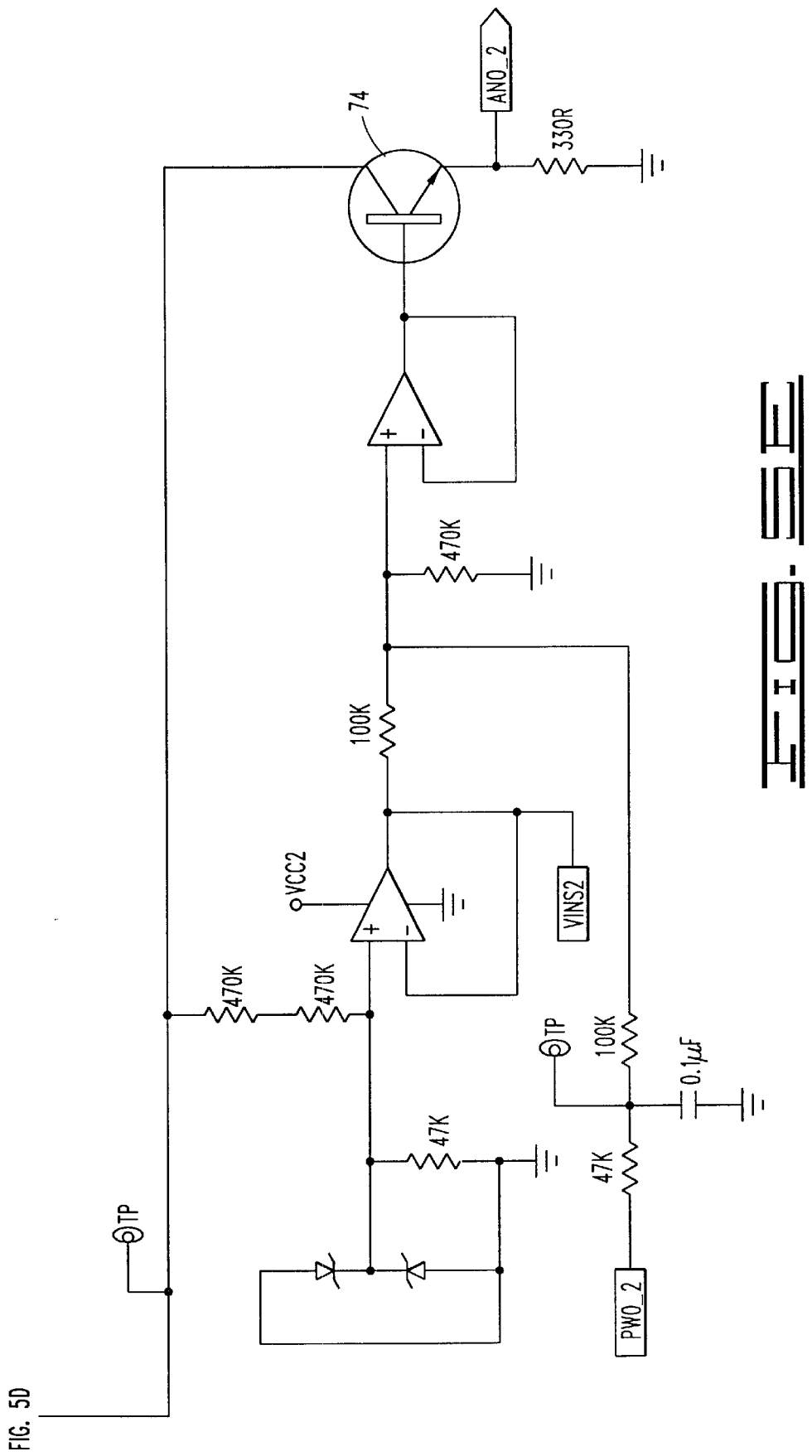

METHOD AND SYSTEM OF COMMUNICATING IN A SUBTERRANEAN WELL

REFERENCE TO MICROFICHE APPENDIX

This specification includes a microfiche appendix containing one (1) sheet of microfiche with thirty-six (36) frames of content.

BACKGROUND OF THE INVENTION

This invention relates generally to methods and systems of communicating for use with subterranean wells, such as oil or gas wells. The invention relates more particularly, but not by way of limitation, to communicating data to the surface of a well from the vicinity of a three-phase downhole induction motor and connected submersible pump.

Techniques for communicating information in a subterranean well have been applied or disclosed with regard to the various operations of drilling, completing and producing oil or gas wells, for example. Communications can occur between locations within a well or between the surface and downhole. For example, command signals to operate a downhole tool might be sent from the surface or data signals from downhole sensors might be sent to the surface.

One environment of particular relevance to the present invention includes a subterranean well in which a three-phase induction motor drives a submersible pump to pump fluid (e.g., oil) out of the well. Three-phase electricity from a power source at the surface energizes the motor through three conductors of a power cable that extends from the surface to the downhole motor. Downhole conditions to monitor for ensuring proper operation of the motor and pump include pump intake pressure and motor winding temperature.

The foregoing is well-known in the industry, and analog and digital communication techniques have been proposed or developed to transmit data about the aforementioned and other downhole conditions. Despite these prior techniques, there is still the need for a new and improved communication method and system that can provide enhanced speed or resolution for transmitted information.

SUMMARY OF THE INVENTION

The present invention meets the aforementioned need by providing a novel and improved method and system of communicating for subterranean wells. The present invention uses both the amplitude and the duration of a pulse to convey information. This enables the information to be transferred more quickly because two items of distinct information can be communication via a single pulse. Alternatively, information can be communicated at the same rate as other single pulse data but with improved resolution.

A method of communicating, for a subterranean well, defined in accordance with the present invention comprises: selecting information to be communicated; and changing at a first location relative to the well an amplitude of a parameter for a specified time duration, wherein the changed amplitude and the specified time duration are derived in response to the selected information and wherein the changed amplitude and-the specified time duration are detectable at a second location relative to the well. In one implementation two distinct items of information can be encoded wherein the information encoded in the amplitude is distinct from the information encoded in the duration. One, more highly resolved, item of information can be defined in that the amplitude and the duration can together represent one aspect of the information to be communicated. Multiple signals can be used to convey the complete information; that is, the amplitude and the duration for a single signal can represent at least part of the information.

The present invention can also be defined as a method of communicating data from a subterranean well having three-phase power conductors connected to a three-phase motor in the well. The magnitude of at least one condition related to the operation of the three-phase motor and a submersible pump connected to the motor is sensed in the well. Encoding occurs in the well such that an amplitude and a duration for at least one electric signal are defined in response to the magnitude of a respective sensed condition. The method further comprises communicating through the three-phase power conductors in response to the encoding. In a particular implementation, communicating through the three-phase power conductors includes changing a voltage on a conductor connected to a neutral point of three windings of the three-phase motor.

The present invention also provides a system for communicating in a subterranean well. The system comprises an information source to provide a signal representing a numerical value to be communicated in a subterranean well. It also comprises an encoder, connected to the information source, to encode the numerical value into at least one amplitude and at least one duration for at least one analog pulse wherein the amplitude and duration for one said analog pulse together define at least part of the numerical value. The system can further comprise: three-phase power conductors disposed in the well; first, second and third windings collectively connected at a common node and individually connected to a respective one of the three-phase power conductors; a first inductor, connected to the common node; a constant d.c. current source connected to the first inductor and an electrical ground; a three-phase motor connected to the three-phase power conductors in the well; a second inductor, connected to a neutral point of windings of the three-phase motor; a transistor connected to the second inductor; and an operational amplifier connected to the transistor, the operational amplifier having an input connected to the encoder.

Therefore, from the foregoing, it is a general object of the present invention to provide a novel and improved method and system of communicating for subterranean wells. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 illustrates an environment for the method and system of the present invention.

FIG. 2 is a simplified diagram of one embodiment of a voltage shifting circuit of the system of the present invention.

FAG. 3 is a block diagram for one embodiment of a surface processing circuit of the environment of FIG. 1.

FIG. 4 is a block diagram for one embodiment of a downhole sensing and, processing circuit of the system of the present invention.

FIGS. 5A–5G are schematic circuit diagrams for a particular implementation of the downhole sensing and processing circuit and the voltage shifting circuit of the present invention.

FIGS. 6A–6D are flow diagrams of programs for controlling a microcomputer of the implementation of FIG. 5.

Figure 7:
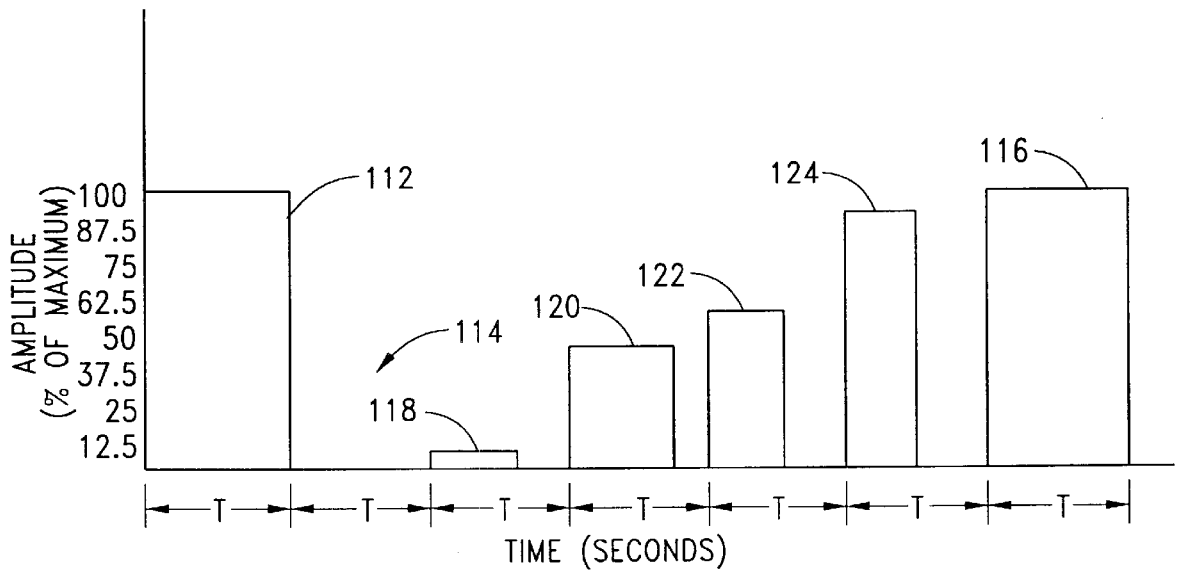

FIG. 7 is a timing diagram to illustrate the encoding technique of the present invention.

DETAILED DESCRIPTION OF THE INVENTION

The present invention comprises a method and system to communicate information from an oil or gas well to the surface for the environment illustrated in the drawings; however, the present invention can be used to communicate from the surface down into the well and in other applications. The system to be described multiplexes the information onto the three-phase power cable that provides electric power to drive a three-phase induction motor which, in turn, drives a submersible pump. The information which is transmitted can include the pressure at the pump intake, the temperature of the oil reservoir, the temperature of the motor windings, or one of the many other parameters relating to the downhole equipment or the downhole reservoir, for example. The system for communicating in a subterranean well particularly includes an information source to provide a signal representing a numerical value to be communicated in the subterranean well. It also includes an encoder, connected to the information source, to encode the numerical value into an amplitude and a duration for an analog pulse. In one embodiment, the amplitude and duration together define the numerical value (e.g., a pressure magnitude). In another embodiment, the amplitude and the duration can each define respective parameters (e.g., a pressure magnitude and a temperature magnitude). In either of these embodiments, the amplitude and/or duration of a single pulse can be used to define either the complete value or only a part; in the latter, multiple pulses (i.e., at least two) collectively define the respective value. The information source and the encoder are embodied in a downhole sensing and processing circuit 2 represented in FIG. 1.

A voltage shifting circuit 4 responds to the downhole sensing and processing circuit 2 to shift a voltage detectable at the surface through the power cable. One implementation of the voltage shifting circuit 4 is shown in FIG. 2 and includes a transistor 6 connected in the electricity transmission circuit extending into the well. The circuit of FIG. 2 also includes an operational amplifier 8 connected to the transistor 6 and the encoder in the downhole sensing and processing circuit 2. Two series connected resistors 10, 12 connect to the electricity transmission circuit and the operational amplifier 8 as shown in FIG. 2; this stabilizes the output voltage. In a more general implementation, an output from the downhole sensing and processing circuit 2 directly drives the base of the transistor 6 (or other device or circuit by which the voltage is appropriately shifted in response to the driving signal).

The electricity transmission circuit to which the voltage shifting circuit 4 is connected includes an inductor 14 connected to the neutral or Y-point of three-phase induction downhole motor 16 energized from a surface-located three-phase power supply 18 connected through a three-phase power cable 20 as represented in FIG. 1. Three windings defining a three-phase inductor 22 at the surface create an artificial neutral point from the three-phase power supply 18. A constant dc current is injected into this neutral point 24 from a dc current source 26 connected through inductor 28 as shown in FIG. 1.

The dc current becomes superimposed on the three-phase ac current flowing from the three-phase power supply 18 to the downhole motor 16. At the neutral or Y-point of the motor 16, the three-phase ac current sums to zero and only the dc current remains. This dc current is used to power the downhole electronics embodied in the downhole sensing and processing circuit 2 and the voltage shifting circuit 4. The dc current passes through an impedance, including the transistor 6 of the FIG. 2 implementation, which is modulated by operation of the downhole sensing and processing circuit 2. The dc current flowing through the impedance produces a voltage which changes dependent upon the information to be sent to the surface. This voltage change, which is detected at the surface, has a magnitude component and a duration component, both of which are used to define the information transmitted from downhole as mentioned above.

Detection at the surface occurs through a voltage sensing circuit 30 and surface processing equipment 32. These are conventional types of devices and do not form part of the present invention; therefore, they will not be further described other than by way of the following reference to FIG. 3. In FIG. 3, the surface processing equipment 32 typically includes an analog-to-digital converter 34 that converts an analog voltage signal from the voltage sensing circuit 30 into a digital format used by a decoder 36 to drive a display 38 to numerically or otherwise indicate the value of the information sent from downhole. The analog-to-digital converter 34 responds to both the magnitude and duration of the output of the voltage sensing circuit 30.

Referring to FIG. 4, a more particular description of the illustrated downhole sensing and processing circuit 2 will be given. The circuit 2 includes one or more sensors 40 (identified as at least one sensor 40a up to some number of sensor 40n that a particular implementation of the remainder of the processing circuit can handle). Each sensor 40 can be a conventional type suitable for sensing the desired downhole condition or parameter. Each sensor 40 provides an analog output channeled through a multiplexer 42 to an analog-to-digital converter 44. The converter 44 digitizes the analog signals into a format used by an encoder 46. The digital output of the encoder 46 is provided to a digital-to-analog converter 48. A particular implementation of the components of FIG. 4 is shown in FIG. 5.

Referring to FIG. 5A, an analog switch 42' implements multiplexer 42 by selecting one of three RTD temperature sensors (not shown) to be active at any one time. Each of these sensors is connected to a respective one of the connectors 50, 52, 54 and to the common connector 56 for the FIG. 5A implementation. A buffer or voltage level protector device 58 is connected to these connectors 50, 52, 54, 56 and to a constant current sink 60. The temperature-responsive electric signals output by the device 58 are input to analog-to-digital converter 44'.

Figure 5B:
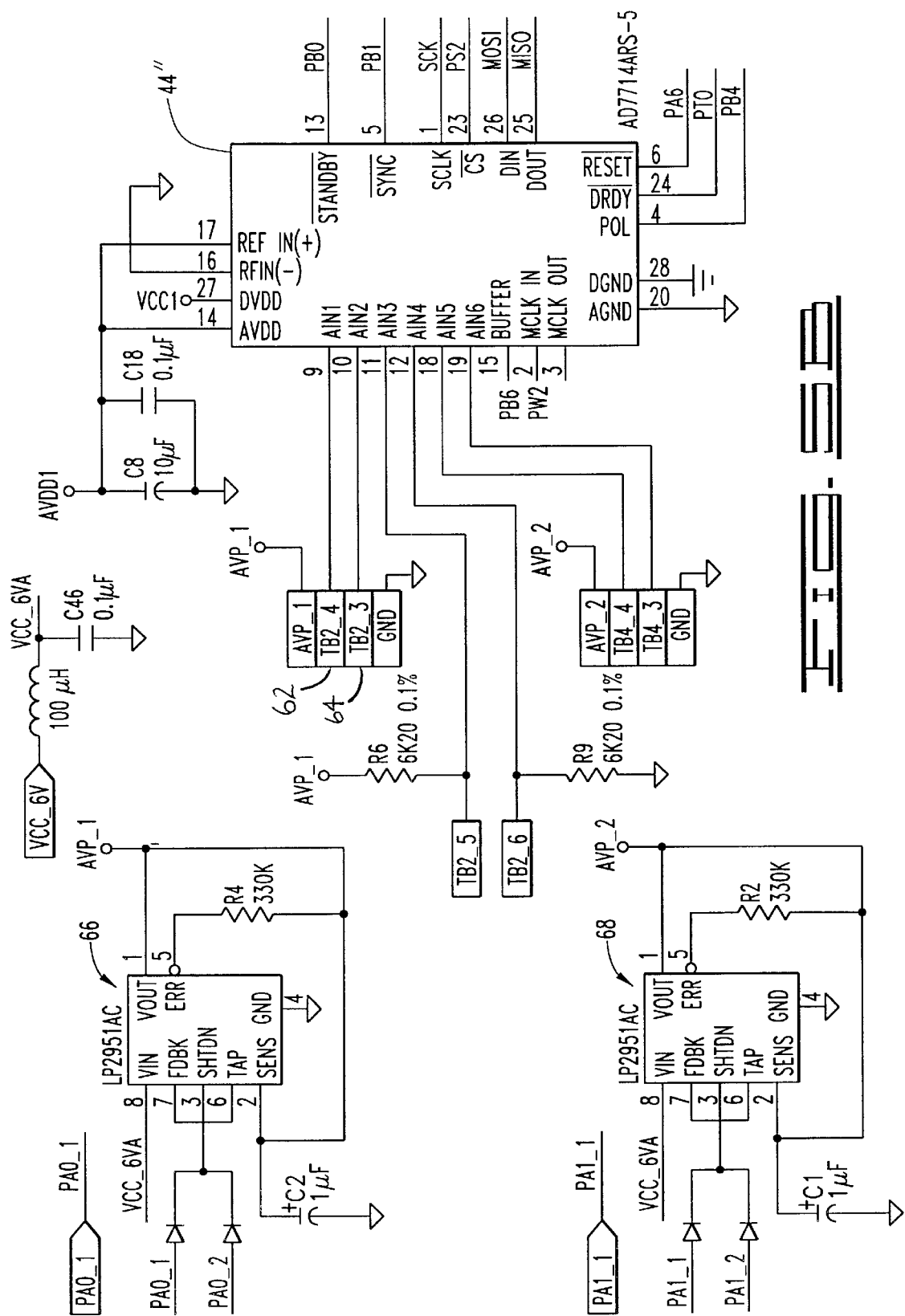
Figure 5C:
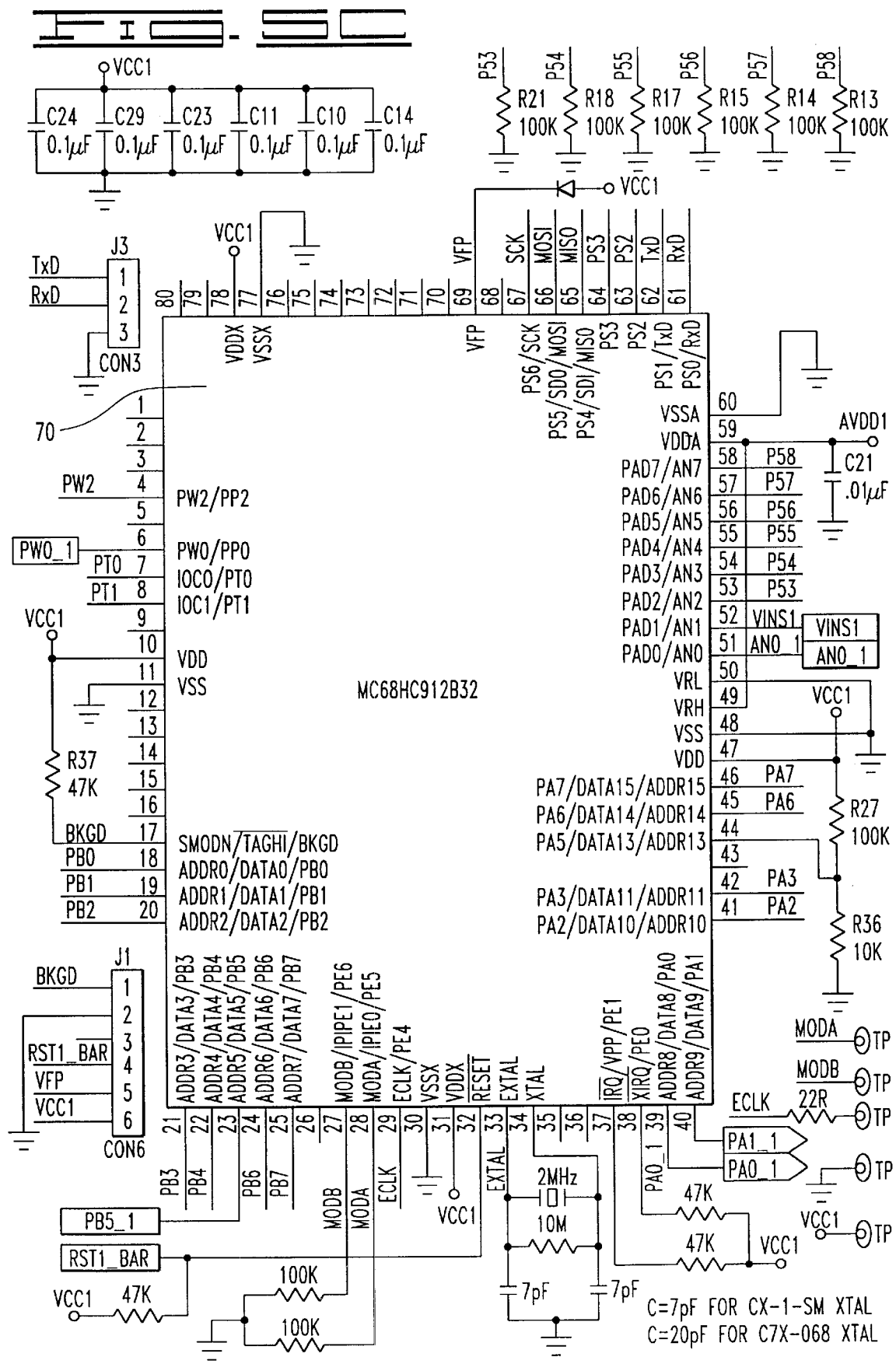

The active channel for temperature signal input is selected via digital signals PA2 and PA3 generated by a microcomputer 70 shown in FIG. 5C. To select the sensor coupled to connector 50, for example, PA2 is set to logic "1" and PA3 is set to logic "0". This results in pin 8 of analog switch 42' being internally connected to pin 5 and pin 9 being internally connected to pin 12. A completed current path then results from AVDD1, through resistor 61, pins 8 and 9 to pins 5 and 12 of analog switch 42', connector 50, the respective connected temperature sensor, connector 56, protector device 58, current sink 60, to ground. Selection of the other temperature sensors occurs in the same fashion but with different PA2 and PA3 signal combinations and resulting operation of analog switch 42'.

An analog-to-digital converter 44" is shown in FIG. 5B. An analog output from a strain gauge pressure transducer (not shown) connected to terminals 62, 64 is provided to the input of the converter 44". Strain gauge power circuit 66 or its redundant backup circuit 68 provides power to the strain gauge pressure transducer.

The serial digital outputs from the analog-to-digital converters 44', 44" are provided to the microcomputer 70 shown in FIG. 5C. The microcomputer is implemented in a single chip format as shown in FIG. 5C. This computer is programmed to provide the encoding as described in more detail below. In general, however, the encoding process implemented using the programmed microcomputer 70 generates a pulse width modulated signal output through pin 6. This signal is labeled PW0_1 in FIG. 5C. Although not shown in the drawings, a particular implementation can include a redundant circuit the same as shown in FIG. 5C but that provides signal PW0_2.

Figure 5D:
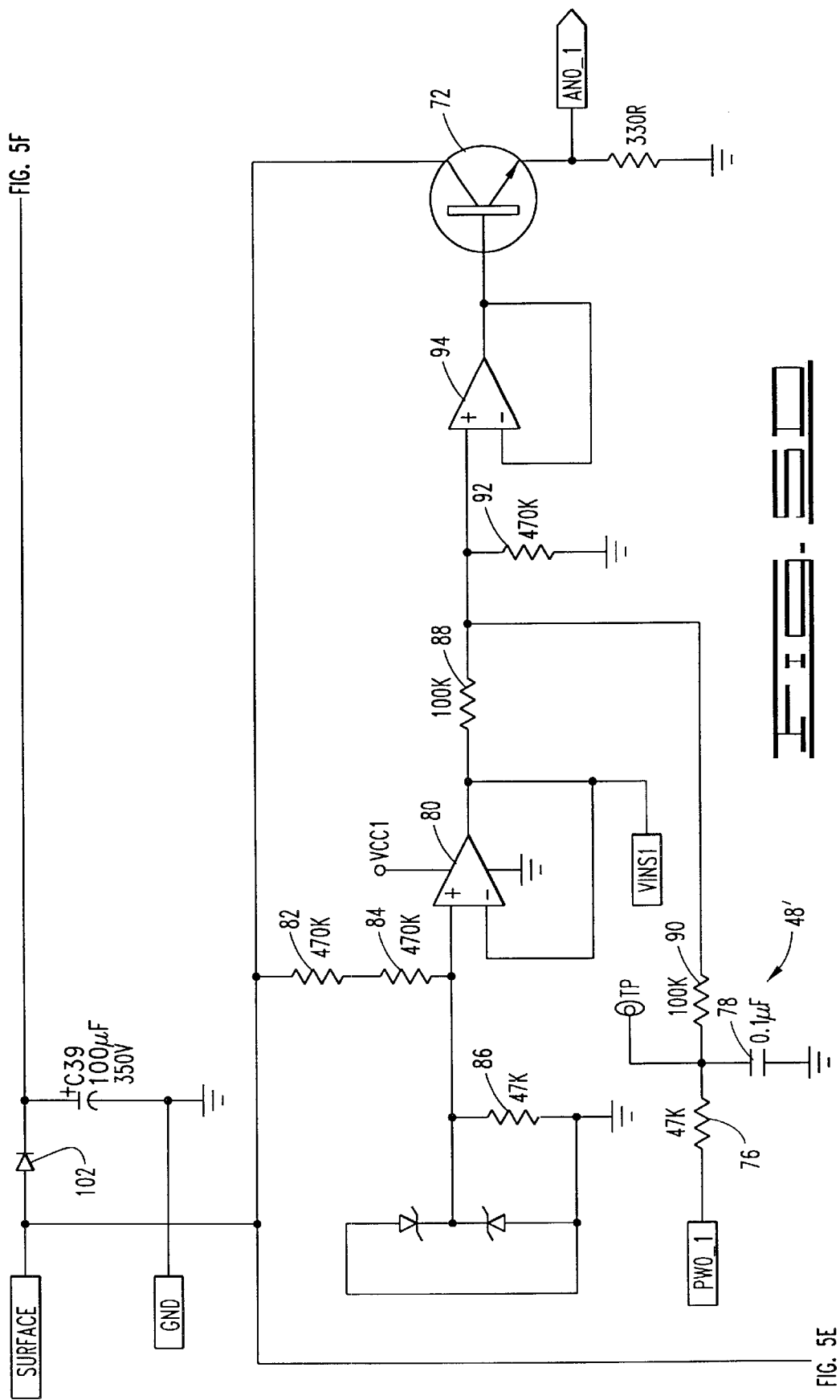

Two redundant circuits implementing digital-to-analog circuit 48 of FIG. 4 and voltage shifting circuit 4 of FIG. 1 are shown in FIGS. 5D and 5E. The circuit of FIG. 5D responds to the PW0_1 signal to drive transistor 72, and the circuit of FIG. 5E responds to the PW0_2 signal to drive transistor 74. Transistors 72, 74 correspond to transistor 6 of the FIG. 2 implementation. Only one of the circuits shown in FIGS. 5D and 5 E is active at any one time. The other circuit provides a standby system in case of failure of the primary circuit. To explain the operation of these duplicate circuits, only the one shown in FIG. 5D will be referred to in the following explanation.

The PW0_1 signal from the microcomputer 70 of FIG. 5C is processed through a digital-to-analog converter 48' implemented by a low-pass filter defined by resistor 76 and capacitor 78 shown in FIG. 5D. This produces a dc level signal having a magnitude proportional to the desired voltage level at the collector of transistor 72, which also defines the desired voltage level change to be sensed at the surface.

Still referring to FIG. 5D, operational amplifier 80 is a unity-gain buffer. Its output is a signal proportional to the actual voltage at the surface as sensed through the chain of resistors 82, 84, 86.

Resistors 88, 90, 92 and operational amplifier 94 shown in FIG. 5D form an adder circuit. The output of this circuit, as measured at the base of transistor 72, is equal to the voltage on the collector of transistor 72 times some constant K1, plus the voltage set by the microprocessor at PW0_1 times a second constant K2. The value of constant K1 is determined in known manner by the values of resistors 82, 84, 86, 88 and 92. The value of constant K2 is determined in known manner by the values of resistors 90 and 92. This circuit forms part of a negative feedback loop that serves to stabilize the voltage at the collector of transistor 72. For example, if electrical noise on the three-phase power cable causes the voltage at the collector of transistor 72 to increase by one volt, the voltage at the output of amplifier 80 increases by constant K1 times one volt, and the voltage at the output of the adder amplifier 94 increases by K1 times one volt. This increased voltage turns on transistor 72 harder, resulting in a lower voltage at the collector of transistor 72. Thus the effect of the one volt of noise on the collector of transistor 72 is reduced by the negative feedback.

One component not shown in FIG. 5D is a 390 ohm resistor physically connected between the location marked "surface" in FIG. 5D and the dc power supply 26 shown in FIG. 1. This resistor may be located with the dc power supply at the surface; but even though it may be located several thousand feet from the downhole electronics shown in FIG. 5D, the 390 ohm resistor provides the collector resistor for transistor 72 in a standard amplifier configuration. Total collector impedance includes the series combination of the 390 ohm resistor, all the surface and downhole inductors, plus the resistance and inductance of the power cable.

Figure 5F:
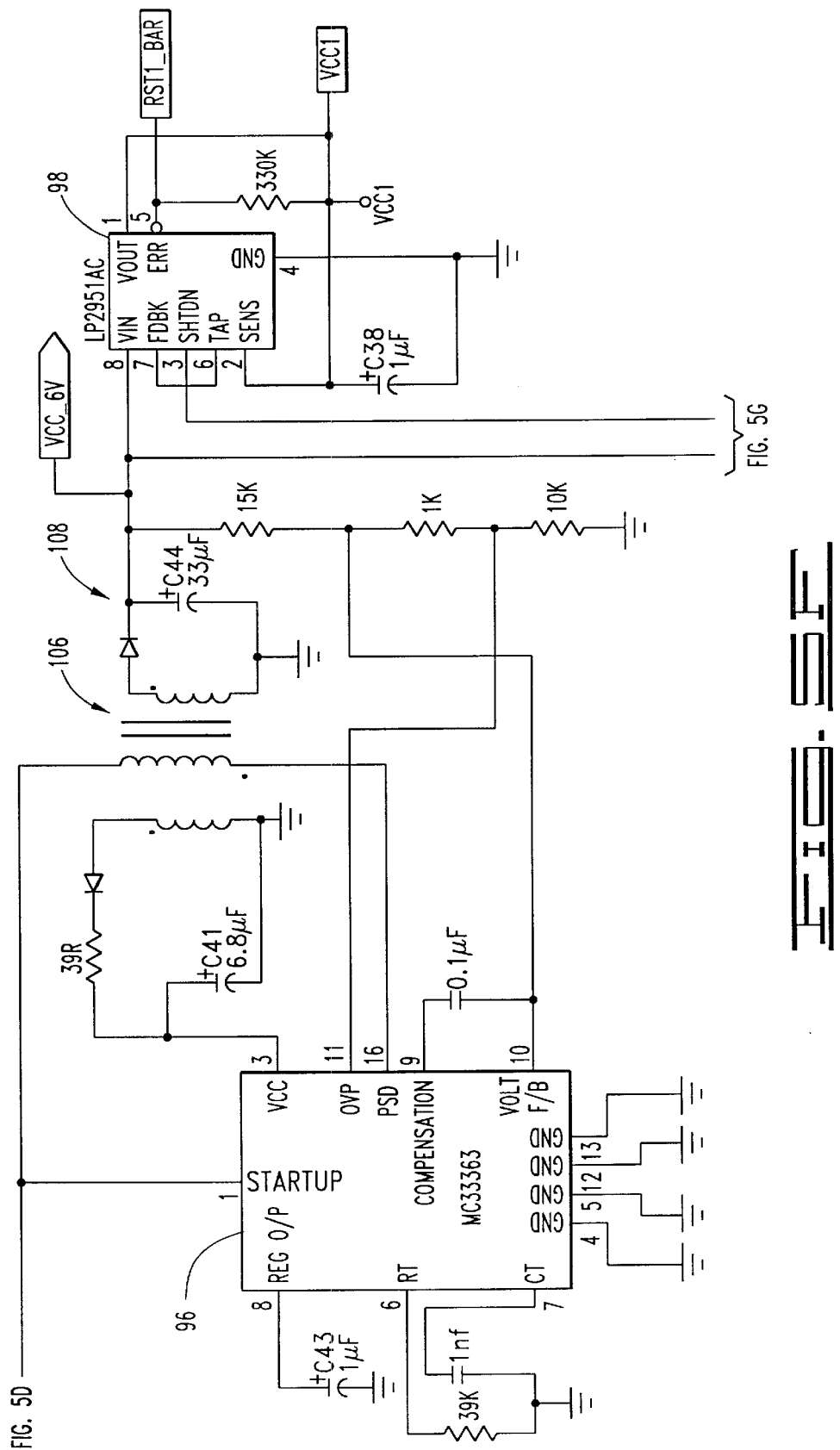
Figure 5G:
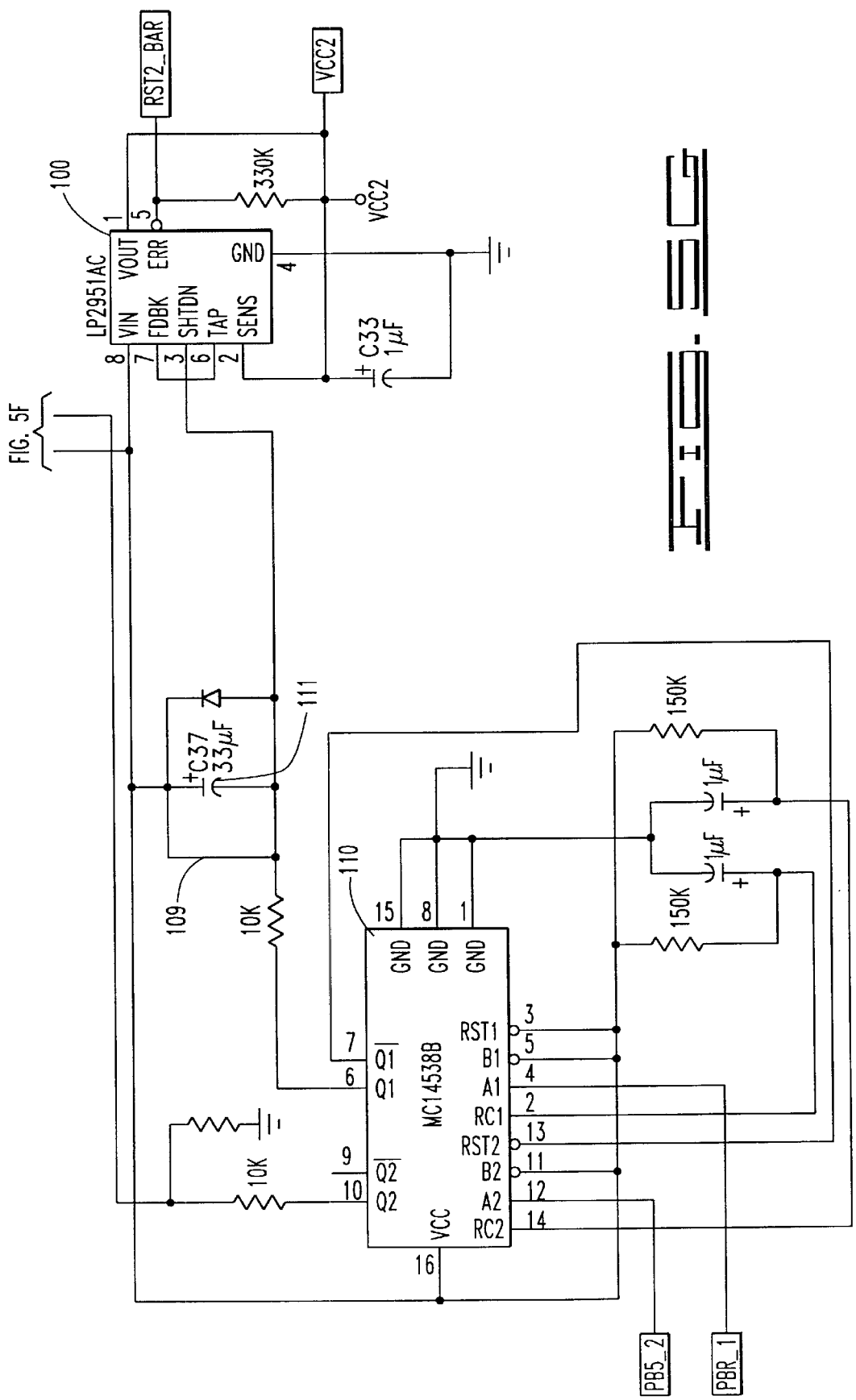

Referring to FIGS. 5F and 5G, these drawings show a particular implementation of a circuit for supplying 5 volts (dc) to the downhole electronics and for controlling which of the redundant circuits is active. In FIG. 5F, switching power supply controller 96 supplies a loosely regulated voltage near 6 volts(dc). Linear voltage regulator 98 (FIG. 5F) and its redundant backup linear voltage regulator 100 (FIG. 5G) provide regulated 5 volt(dc) power levels. Devices 98, 100 also provide signals that indicate if the regulated voltage has dropped too low, in which case the respective microcomputer is reset. Reset occurs for the respective microcomputer when the respective +5 volts(dc) is provided. The respective regulated power is labeled VCC1 in FIG. 5F and VCC2 in FIG. 5G.

When the circuit of FIG. 5F is energized by the direct current source 26 from the surface as communicated through diode 102 in FIG. 5D, the switching power supply controller 96 drives transformer 106 (FIG. 5F) having a rectifying circuit 108 connected to its secondary winding. The output of the circuit 108 is the approximately 6 volt(dc) voltage input to both of the linear voltage regulators 98, 100. For the particular implementation, but not by way of limitation as to the invention, the transformer 106 is a Magnetics Inc. ZF41406-TC ferrite core having fifty-four primary turns, nineteen secondary turns, and forty-three tertiary turns in its multifiliar windings made of 28 AWG wire.

The output, VCC_6V, of the rectifying circuit 108 produces regulated +5 volts(dc) at the output of linear voltage regulator 98 if the regulator 98 is not disabled. It is enabled in the illustrated implementation because a jumper 109 disables the redundancy function implemented with the circuit of FIG. 5G.

If the redundancy feature of the particular implementation were used, it would operate as follows. Before the circuit of FIG. 5G is powered up, and with the jumper wire 109 removed, there are zero volts across capacitor 111 and outputs Q1 and Q2 of the monostable multivibrator device 110 are at low logic levels. When VCC_6V first rises to 6 volts (dc), the voltage across capacitor 111 initially stays at zero so a high logic level signal exists at pin 3 of the voltage regulator 100 whereby the regulator 100 is shutdown. Since the regulator 100 is shutdown, VCC2 is zero and so the redundant circuit is not energized to the extent it uses VCC2. Output Q2 of device 110 remains at a low logic level so this does not shutdown voltage regulator 98; thus, VCC1 of 5 volts(dc) is provided by regulator 98 to energize the microcomputer 70 and the other circuits operating in response to this VCC1. As part of the program running in microcomputer 70, the digital output PB5_1 is repeatedly toggled between low and high logic levels. This repeatedly triggers the portion of device 110 providing outputs Q1 and $\overline{Q1}$ so that Q1 is continually held high and $\overline{Q1}$ is continually held low. A logic high Q1 holds the regulator 100 in shutdown mode. A logic low $\overline{Q1}$ disables the other portion of the device 110 from being triggered. This continues as long as microcomputer 70 toggles PB5_1 regularly, which it does if operating properly. If the microcomputer 70 fails, it stops toggling PB5_1 whereby Q1 of the device 110 eventually goes to a logic low and $\overline{Q1}$ eventually goes to a logic high. Regulator 100 then becomes energized and provides 5 volts(dc) for VCC2 to the redundant microcomputer (not shown). The high $\overline{Q1}$ enables the other portion of device 110, which then is triggered by a toggled PB5__2 when the engaged redundant microcomputer runs its program. This changes Q2 to a high logic level, which shuts down the regulator 98 and deenergizes the microcomputer 70.

Figure 6A:
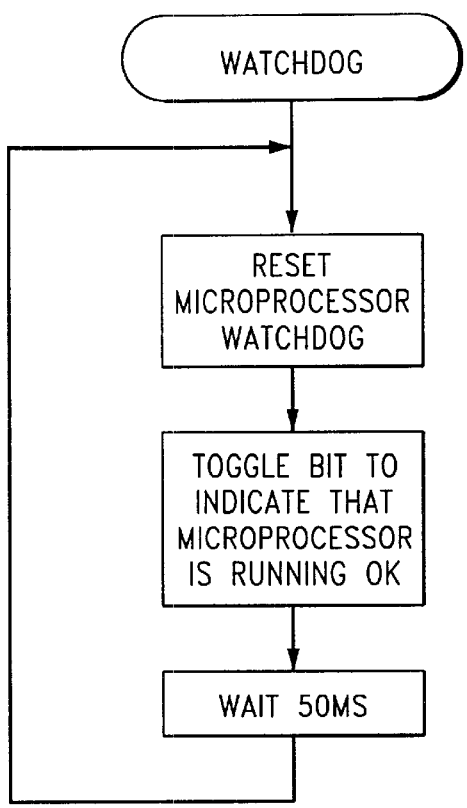

Whenever a respective one of the microcomputers is energized, it determines if it is operating properly. If it is, the respective PB5__(1,2) signal is sent to shut down the redundant circuit. If the energized microcomputer is not operating properly, it ends operation by becoming deenergized due to the operation of the device 110 described above. FIG. 6A shows a flow diagram for the self-checking program of the microcomputer 70 (see also the watchdog.c program in the microfiche appendix); if improper operation occurs, the "watchdog" is not reset so the PB5__1 signal is not generated. This starts the sequence by which the regulator 98 is shut down as described above.

Once one of the redundant microcomputer circuits is up and operating, it performs the following under control of its programming.

The active microcomputer (in this example, microcomputer 70 shown in FIG. 5C) determines whether data is to be read. If it is;

the microcomputer reads the data and encodes the data. To read the data, the microcomputer receives the digitized inputs from the analog-to-digital converters 44', 44" which are derived from the analog signals provided by the respective sensors 40. The sensors sense respective conditions in the well. As mentioned above, these can be any selected conditions; however, in the illustrated embodiment, they are the magnitudes of one or more temperatures and pressures related to the downhole environment and the operation of the three-phase motor and a submersible pump connected to the motor. Specific examples include pressure at an intake of the submersible pump, temperature of oil in the subterranean reservoir, and temperature of windings of the three-phase motor.

Once data has been read, it is encoded by the microcomputer.

Specifically, information is encoded in an amplitude and a duration for a pulse. In the embodiment further described below, the amplitude and duration together represent one aspect of the information to be communicated. That is, this format defines one measurement via a combination of the amplitude and duration of one or more pulses. In another embodiment, however, the information encoded in the amplitude is distinct from the information encoded in the duration (e.g., a temperature encoded in the amplitude and a pressure encoded in the duration). Using this latter technique, information can be more quickly transmitted to the surface since two parameters or values are being conveyed in a single communication. In the first-mentioned technique, the transmission contains one parameter or value (or part thereof) per pulse;

however, that measurement is transmitted with improved resolution using both the amplitude and duration to refine the resolution.

Once the microcontroller has computed the desired amplitude and magnitude, it provides a digital output used by the digital-to-analog converter 48 ' (FIG. 5D) to generate the responsive pulse of desired magnitude and duration. In a particular implementation, the amplitude is encoded in one of a plurality of discrete magnitudes and the duration is encoded within a continuum throughout a predetermined time period.

More particularly, the microcomputer 70 (if the active one of the redundant microcomputers) determines what dc voltage magnitude and duration are required to represent the desired information. A digital pulse-width-modulated (PWM) signal from the microcomputer is converted by the resistor 76 and capacitor 78 implemented digital-to-analog converter 48 ' to give a voltage proportional to the required dc voltage. This voltage is buffered by the operational amplifier 94 which drives the base of the NPN transistor 72 to operate in the linear region. This is provided through the circuit shown in FIG. 5D or its redundant circuit shown in FIG. 5E. This results in a voltage or voltage change, detectable at the surface, which corresponds to the voltage required to represent the desired information.

When data is to be sent, the microcomputer 70 in this example first determines whether this is the beginning of a new series of data. For the example illustrated in FIGS. 5A and 5B in which three temperatures and one pressure are read, one series includes a transmission of one value for each of these four parameters. If the microcomputer 70 determines that a new series is to begin, it outputs a start pulse, an example of which will be described below with reference to FIG. 7. Once the start pulse has been sent, or if this particular transmission is not the beginning of the series, the microcomputer outputs the amplitude and duration control signal as described above. If it is the end of the series, the microcomputer outputs a stop pulse.

In accordance with the foregoing, the method of the present invention includes selecting information to be communicated and changing at a first location relative to the well (e.g., the downhole location for the illustrated implementation) an amplitude of a parameter for a specified time duration. The changed amplitude and the specified time duration are derived in response to the selected information, and the changed amplitude and the specified time duration are detectable at a second location relative to the well (e.g., at the surface for the illustrated implementation). The changed parameter in the illustrated embodiment is an analog electrical signal, specifically a dc voltage on a conductor connected to the three-phase power cable 20 in the well. In the illustrated embodiment, the voltage is changed by appropriately driving a transistor (e.g., transistor 72 ) in the well in response to a pulse having its amplitude and duration controlled to define the parameter whose measurement is to be transmitted. The amplitude is defined by driving the transistor within its linear operating range to achieve the desired voltage magnitude on the conductor, and this is held for an amount of time determined in the encoding process of the present invention.

One particular technique for encoding the data through the operation of the active microcomputer of the downhole system assigns a gross level using the pulse amplitude and a fine adjustment using the duration of the pulse. Consider a system that can read a dc voltage with in +/−6.24% of full scale. That is, if a direct current (dc) voltage having a magnitude of 6.25% of full scale represent a particular value, the surface equipment decodes this value for any signal it reads between 0.01% of full scale and 12.49% of full scale (i.e., 6.25% of full scale +/−6.24% of full scale). With this assumption, different voltage levels for the pulse can be sent to represent up to eight levels or values. See the follow table and subsequent explanation:

| sensed condition magnitude (% of full scale) | gross resolution amplitude level (first multiplier) | voltage output per level (% of full-scale output voltage) | duration range to refine gross resolution (seconds) (−2 = second multiplier) |
|---|---|---|---|
| 100 | 7 | 93.75 | 2–3 |
| 87.5 | 6 | 81.25 | 2–3 |
| 75 | 5 | 68.75 | 2–3 |
| 62.5 | 4 | 56.25 | 2–3 |
| 50 | 3 | 43.75 | 2–3 |
| 37.5 | 2 | 31.25 | 2–3 |
| 25 | 1 | 18.75 | 2–3 |
| 12.5 | 0 | 6.25 | 2–3 |
| 0 | | | |

A given sensed magnitude taken as a percentage of its full-scale range is within one of the gross resolution levels of the foregoing table (e.g., a temperature magnitude equal to 54% of the full temperature scale has a gross resolution amplitude level of 4). For the level assigned, the output pulse provided on the communication line in the well has the corresponding magnitude listed in the third column of the table (for the aforementioned temperature example, a gross resolution level of 4 is represented by a voltage pulse having a magnitude of 56.25% of the full-scale output voltage at the collector of the transistor 72, which voltage output causes a corresponding voltage change at the surface that can be read at the surface within +/−6.24% in this example).

With the foregoing characteristics for this example, only eight values can be sent using voltage magnitude alone. Using the duration of the output pulse, however, a higher resolution can be obtained. The fourth column of the above table shows a one-second duration range (i.e., the time between two and three seconds) at each gross resolution level. One way to relate the gross resolution amplitude level and the duration range to achieve the higher resolution is set forth in the following equation:

sensed condition magnitude (% of full scale)=(gross resolution amplitude level×12.5)+(duration %×12.49)

Four examples using the above table and equation are given below for a pressure assumed to have a full scale range of 100 psi (i.e., pressure can be read between 0 psi and 100 psi). These are based on assumed pressure readings of 7 psi, 49.99 psi, 52 psi, and 87.5 psi sensed through the pressure sensor connected to terminals 62, 64 in FIG. 5B. Idealized representations of resulting pulses output at the collector of the transistor 72 are shown in FIG. 7.

Also shown in FIG. 7 is a stop pulse 112 from a previously transmitted series, a start pulse 114 for the illustrated series, and a stop pulse 116 for the illustrated series. Each stop pulse in this example has an amplitude of 100% of full scale of the output voltage communicated via operation of the transistor 72 in the circuit of FIG. 5D. The duration is the maximum period, T, of four seconds in the illustrated example. Each start pulse has a 0% amplitude for the maximum period duration of four seconds. Each pulse used to communicate information has a magnitude corresponding to one of the eight magnitudes in the third column of the above table and a duration between two and three seconds. The beginning of each pulse occurs at the beginning of a respective four-second period T.

Four pulses 118, 120, 122, 124 representing the aforementioned pressures are generated at the collector of the transistor 72 in accordance with the following calculations performed or otherwise implemented within the active microcomputer of the system of FIG. 5 based on the equation set forth above using the respective gross resolution amplitude level from the table set forth above:

7 psi=7% of full scale pressure=(0×12.5)+(duration %× 12.49) Pulse 118

7=duration %×12.49 duration=56% of time scale pulse 118=6.25% of voltage full scale (from third column of the table, for level 0) for 2.56 seconds (from fourth column of the table, minimum pulse duration of 2 seconds plus 56% of one-second maximum duration interval)

49.99 psi=49.99% of fill scale pressure=(3×12.5)+(duration %×12.49) Pulse 120

12.49=duration %×12.49 duration=100% of time scale pulse 120=43.75% of voltage full scale for 3.0 seconds 52 psi=52% of full scale pressure=(4×12.5)+(duration %× 12.49) Pulse 122

2=duration %×12.49 duration=16% of time scale pulse 122=56.25% of voltage full scale for 2.16 seconds 87.5 psi=87.5% of full scale pressure=(7×12.5)+(duration %×12.49) Pulse 124

0=duration %×12.49 duration =0% of time scale pulse 124=93.75% of voltage full scale for 2.0 seconds The foregoing can be implemented in the microcomputer of the encoder of the present invention by programmed equations or by look-up tables or other means of deriving control parameters from an input signal to create a corresponding output signal.

Furthermore, different techniques can be used for encoding by way of the amplitude and duration of each pulse. Without limiting the scope of the present invention, other examples include using an inverse relationship between the sensed condition magnitude and the gross resolution amplitude level and/or the duration range (e.g., the smallest amplitude pulse might be used to designate the highest magnitude range of the sensed condition). Again without limiting the alternatives, different resolution or tolerance ranges can be used such that there may be overlap whereby one sensed condition magnitude can be represented by pulses of different magnitudes and durations. In such a version, it might be preferable to pick the pulse closer or closest to midrange on the time scale to avoid sensitivity errors that might be more material at the time limit boundaries than at midrange. Still further, discrete time intervals can be used for the duration range in a manner similar to the gross resolution amplitude levels of column 2 of the above table. Further, the significance of what the amplitude or the duration represents can be different from that otherwise described herein (e.g., the duration can define the gross value and the amplitude can define the fine adjustment).

In whatever manner determined, the microcomputer then uses the amplitude and duration values to generate a digital output signal (e.g., a pulse width modulated signal) that produces an analog drive signal from the digital-to-analog converter for driving the transistor (or other device or circuit) to achieve the requisite voltage pulse.

To summarize the foregoing particular technique, the present invention determines the magnitude of the sensed condition as a percentage of full scale. The encoder selects a gross amplitude level, and it then determines a duration constituting an addition to the gross amplitude level to equal the specific percent of full scale for the sensed condition. This is generated in the preferred embodiment as a digital value which is output to drive a digital-to-analog converter to create an analog signal that operates a transistor within its linear region to establish the voltage and duration for a direct current pulse applied to a conductor communicated with the surface sensing equipment. Accordingly, both the amplitude and duration are used to communicate downhole information to the surface.

Figure 6B:
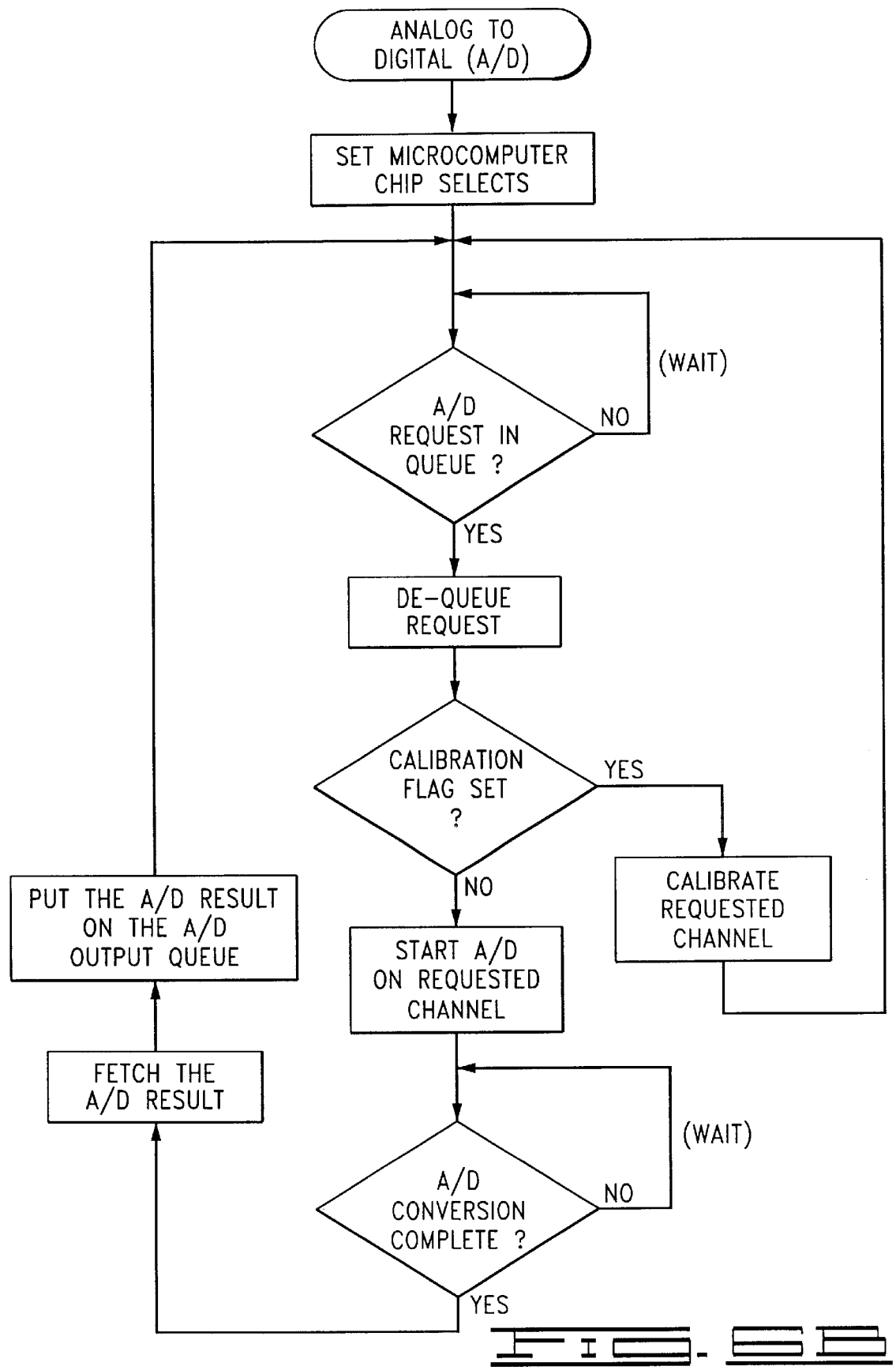
Figure 6C:
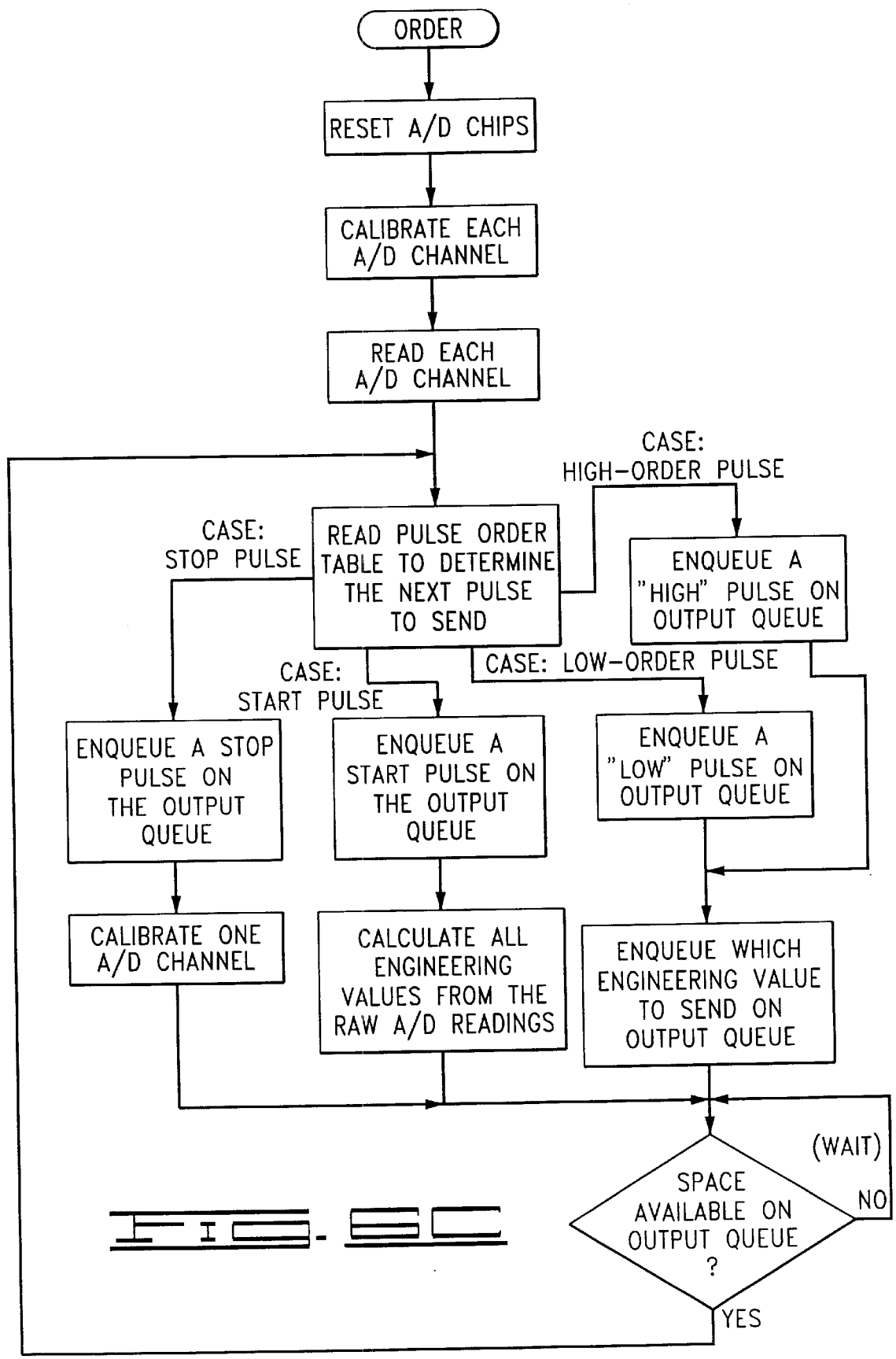
Figure 6D:
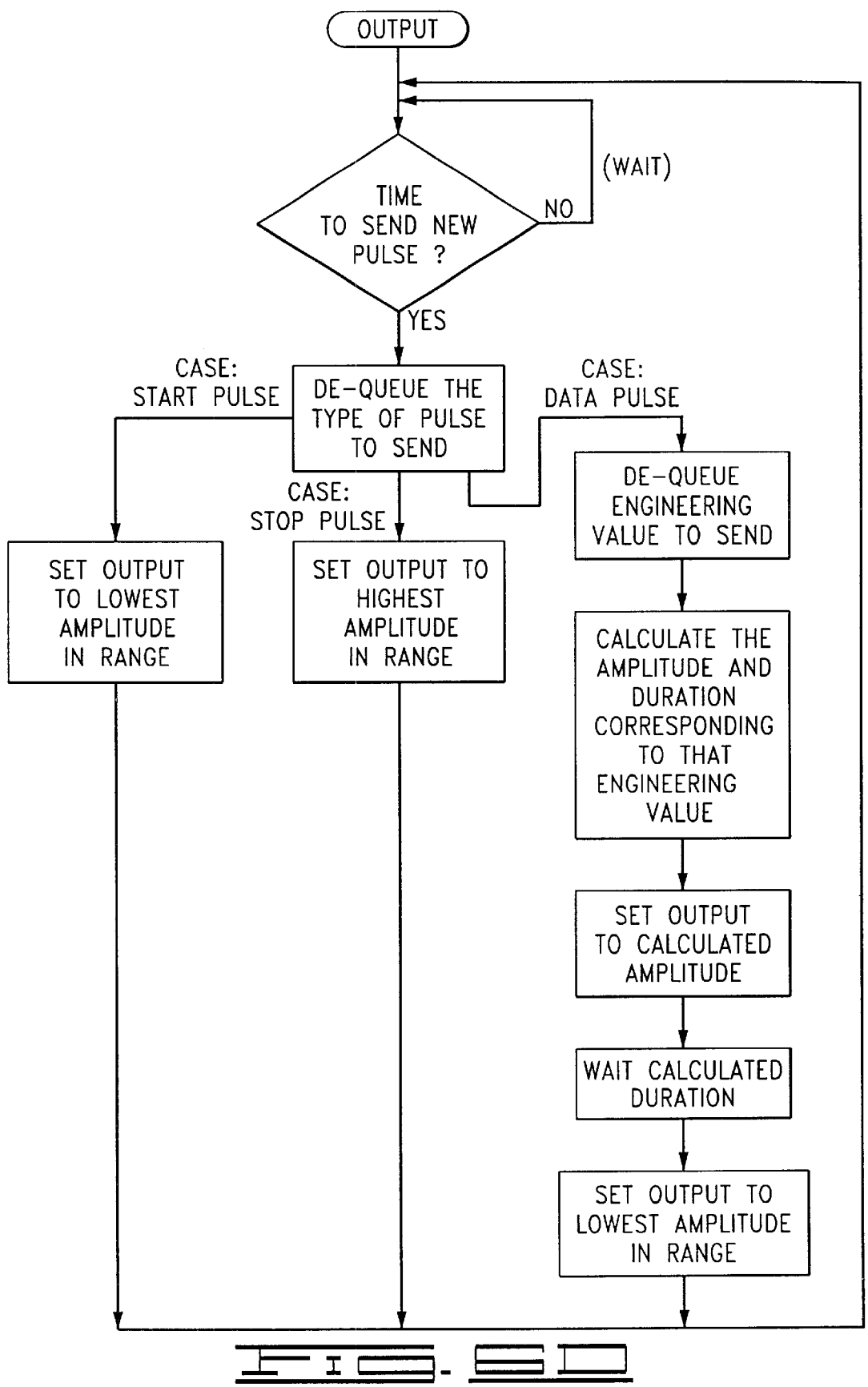

A particular implementation of the data gathering, encoding, and transmitting is illustrated in the flow diagrams of FIGS. 6B–6D and the program listings set forth in the microfiche appendix. This implementation uses two pulses to convey a single measurement; however, changes from reading to reading of the same sensed condition may be indicated by transmitting only a low order pulse if the change is within the overall range of a previously sent high order pulse.

In this particular implementation, the high order pulse is transmitted first and has a discrete amplitude and a discrete an duration. For the resolution used in the example set forth above, there are eight discrete amplitude levels. Discrete levels are also used for the duration of the high order pulse; if the same resolution is used for the time scale as for the amplitude scale, then there are eight discrete duration levels as well. In this case, there can be one of sixty-four gross or high order values indicated by one high order pulse.

Regarding the low order pulse, this is generated with a discrete amplitude and a continuous duration such as in the manner as illustrated in the example set forth above. Thus, more than sixty-four values can be indicated, and each of these acts as a refinement of the value indicated by the previously transmitted high order pulse.

It is desirable to manipulate the pulse designations so that the low order pulse for at least the initial value of the sensed condition is in midscale for its amplitude and duration if possible. This allows only low order pulses to be subsequently sent if the sensed condition does not vary over a wider range than can be designated within the range of the low order pulse. That is, if the sensed condition typically varies within a relatively small range, then changes can be designated by using one high order pulse repeatedly referred to for subsequently transmitted low order pulses that reflect changes that have remained within the range that the low order pulse can designate.

The flow diagrams and the program listings are readily understandable by those skilled in the art given the description of the present invention set forth above. It is noted, however, that each task indicated in FIGS. 6B–6D is written as an endless loop. A real-time operating system, RTXC from Embedded Systems Products Inc. of Houston, Tex., as may be readily modified to function with the specific programs set forth in the microfiche appendix, coordinates the tasks and handles the data queues. In each task, a "wait" operation can occur, wherein the operating system suspends that task until the required information is available or until a required time has elapsed. When a task is suspended, the next highest priority task that is ready to run, with all required information available, is allowed to run. That task then runs until it encounters a "wait" condition. In this manner, all tasks share the microprocessor as required, and each task runs in its own endless loop.

In general, FIG. 6B describes the microcomputer 70 control of the analog-to-digital conversion process to receive a digital representation of the measured condition as obtained through the circuits of FIGS. 5A and 5B (see also the atod.c, atod_tsk.c, and spi.c programs in the microfiche appendix). FIG. 6C represents the microcomputer 70 control for obtaining the digitized values, calculating the engineering values from the digitized data received from the analog-to-digital conversion, determining which pulses are to be sent, and queuing the pulses for output (see also the ordr$_{13}$ tst.c, calc$_{13}$ val.c, rtd.c, and pressure.c programs in the microfiche appendix). The flow diagram of FIG. 6D shows the output control (see also the output.c program in the microfiche appendix). The type of pulse is de-queued, with the appropriate amplitude and duration being output.

From the foregoing, another way of defining the method of the present invention is one of encoding and transmitting electric signals between locations relative to the well in which the method is performed. The encoding and transmitting particularly include providing analog pulses having amplitudes and durations defined in response to numerical values to be communicated from one location to another relative to the well. In one described embodiment, at least one of the numerical values is represented by a combination of both the amplitude and duration of a single one of the analog pulses. In another, the embodiment just described above, at least one of the numerical values is represented by a combination of the amplitudes and durations of at least two of the analog pulses.

In the latter case where at least two pulses are used to define one value, a first analog pulse having an amplitude and a duration together defining part of the respective numerical value is generated, and a second analog pulse having an amplitude and a duration together defining the rest of the respective value is generated. If a subsequent value to be communicated is within a predetermined range of the prior value, which range is defined by the range encompassed by the numerical scope that can be designated by a lower order pulse for a particular implementation, then only a "second" pulse need be encoded and transmitted because the value derived from the previously sent "first" pulse can be reused. Thus, a third pulse (relative to the first and second pulses already mentioned) functioning as the low order pulse for this value that is to be communicated is generated. This third analog pulse has an amplitude and a duration that together define that portion of the later respective numerical value not defined by the amplitude and the duration of the first analog pulse such that the second respective numerical value is fully defined by the amplitude and duration of the first analog pulse in combination with the amplitude and duration of the third analog pulse. In the preferred embodiments, the respective numerical values correspond to magnitudes of conditions sensed in the well.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of communicating, for a subterranean well comprising:

selecting information to be communicated; and changing at a first location relative to the well an amplitude of a parameter for a specified time duration, wherein the changed amplitude and the specified time duration are derived in response to the selected information and, wherein the changed amplitude and the specified time duration are detectable at a second location relative to the well, wherein the information to which the amplitude is responsive to is distinct from the information to which the duration is responsive.

2. A method as defined in claim 1, wherein the parameter is an analog electric signal.

3. A method as defined in claim 1, wherein the parameter is voltage on a conductor connected to a three-phase power cable in the well.

4. A method as defined in claim 1, wherein:

selecting information includes sensing a condition in the well; and changing an amplitude of a parameter for a specified time duration includes encoding at least part of the magnitude of the sensed condition in the changed amplitude and the specified time duration.

* * * * *

UNITED STATES PATENT AND TRADEMARK OFFICE
CERTIFICATE OF CORRECTION

PATENT NO. : 6,396,415 B1
DATED : May 28, 2002
INVENTOR(S) : James H. Bulmer

It is certified that error appears in the above-identified patent and that said Letters Patent is hereby corrected as shown below:

Column 2,
Line 59, delete "FAG." and insert -- FIG. -- therefor.
Line 62, delete the comma after "and".

Column 6,
Line 62, delete "$PB5_{13}1$" and insert -- PB5_1 -- therefor.
Line 65, delete "Q1" and insert -- $\overline{Q1}$ -- therefor.

Column 8,
Line 59, delete "with in" and insert -- within -- therefor.
Line 61, delete "represent" and insert -- represents -- therefor.

Column 10,
Line 11, insert -- Pulse 118: -- in front of "7 psi=7%...".
Line 12, delete "Pulse 118".
Line 22, insert -- Pulse 120: -- in front of "49.99 psi=49.99%...".
Line 23, delete "Pulse 120".
Line 28, insert -- Pulse 122: -- in front of "52 psi=52%...".
Line 29, delete "Pulse 122".
Line 34, insert -- Pulse 124: -- in front of "87.5 psi=87.5%...".
Line 35, delete "Pulse 124".

Column 11,
Line 30, delete "an" before "duration."

Column 12,
Lines 15 and 16, delete "$ordr_{13}tst.c$" and insert -- ordr_tst.c -- therefor.
Line 16, delete "$calc_{13}val.c$" and insert -- calc_val.c -- therefor.

UNITED STATES PATENT AND TRADEMARK OFFICE
CERTIFICATE OF CORRECTION

PATENT NO. : 6,396,415 B1
DATED : May 28, 2002
INVENTOR(S) : James H. Bulmer

It is certified that error appears in the above-identified patent and that said Letters Patent is hereby corrected as shown below:

<u>Column 13,</u>
Line 14, delete "to," first occurrence.

Signed and Sealed this

Twenty-second Day of October, 2002

Attest:

Attesting Officer

JAMES E. ROGAN
Director of the United States Patent and Trademark Office